US012768149B2

(12) United States Patent
Kamoto et al.

(10) Patent No.: US 12,768,149 B2
(45) Date of Patent: Oct. 20, 2026

(54) CONSTRUCTION MACHINE

(71) Applicant: Hitachi Construction Machinery Co., Ltd., Tokyo (JP)

(72) Inventors: Daigoro Kamoto, Chiyoda-ku (JP); Ryo Ota, Chiyoda-ku (JP); Kenji Kawasaki, Tsuchiura (JP); Shigeyuki Sakurai, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 29 days.

(21) Appl. No.: 19/110,170

(22) PCT Filed: Sep. 26, 2023

(86) PCT No.: PCT/JP2023/034898

§ 371 (c)(1),
(2) Date: Mar. 10, 2025

(87) PCT Pub. No.: WO2024/075590

PCT Pub. Date: Apr. 11, 2024

(65) Prior Publication Data

US 2026/0085500 A1 Mar. 26, 2026

(30) Foreign Application Priority Data

Oct. 6, 2022 (JP) ................................. 2022-161981

(51) Int. Cl.
*E02F 9/26* (2006.01)
*E02F 9/22* (2006.01)
(Continued)

(52) U.S. Cl.
CPC ............ *E02F 9/268* (2013.01); *E02F 9/2267* (2013.01); *E02F 9/2278* (2013.01); *F15B 1/26* (2013.01);
(Continued)

(58) Field of Classification Search
CPC . E02F 9/22; E02F 9/226; E02F 9/2267; E02F 9/2278; E02F 9/268; F01M 11/10;
(Continued)

(56) References Cited

U.S. PATENT DOCUMENTS 4,621,593 A * 11/1986 Rao ......................... F02B 47/00
44/364
6,321,692 B1 * 11/2001 Rayner .................. F02M 25/14
123/198 A (Continued)

FOREIGN PATENT DOCUMENTS

CN 115279977 B * 6/2024 .............. F15B 13/02
EP 3396176 A1 * 10/2018 ............ F15B 21/087
(Continued)

OTHER PUBLICATIONS

International Search Report (PCT/ISA/210) issued in PCT Application No. PCT/JP2023/034898US dated Oct. 24, 2023 with English translation (6 pages).
(Continued)

*Primary Examiner* — Babar Sarwar
(74) *Attorney, Agent, or Firm* — Crowell & Moring LLP

(57) ABSTRACT

There is provided a construction machine capable of increasing the intervals for replacing a hydraulic fluid. A hydraulic excavator includes an additive tank for storing an additive, an additive supply line for supplying the additive from the additive tank to a hydraulic fluid tank, an on-off valve disposed on the additive supply line and switchable between a closed state and an open state, a degree-of-oxidation sensor for sensing the degree to which the hydraulic fluid has been oxidized, and a controller. The controller performs control for reporting that the on-off valve is to switch into the open state or control for switching the on-off valve into the open state when the rate of change in the degree to which the hydraulic fluid has been oxidized is equal to or higher than
(Continued)

a predetermined value. The controller performs control for reporting that the on-off valve is to switch into the open state or control for switching the on-off valve into the open state when the machine uptime from the time of replacement of the hydraulic fluid or the machine uptime from the time of switching of the on-off valve from the open state into the closed state is equal to or longer than a predetermined value.

7 Claims, 10 Drawing Sheets

(51) Int. Cl.
*F15B 1/26* (2006.01)
*F15B 19/00* (2006.01)
*F15B 21/04* (2019.01)

(52) U.S. Cl.
CPC ............ *F15B 19/005* (2013.01); *F15B 21/04* (2013.01); *F15B 2211/857* (2013.01)

(58) Field of Classification Search
CPC ......... F01M 5/002; F15B 1/26; F15B 19/005; F15B 21/04; F15B 21/041; F15B 21/0423; F15B 2211/20515; F15B 2211/20538; F15B 2211/615; F15B 2211/62; F15B 2211/6303; F15B 2211/632; F15B 2211/6326; F15B 2211/655; F15B 2211/857; F16N 29/00; F16N 39/00; F16N 39/002; F16N 39/02; F16N 39/06
See application file for complete search history.

(56) References Cited

U.S. PATENT DOCUMENTS

| | | | | |
|---|---|---|---|---|
| 7,469,661 | B2 * | 12/2008 | Kunstmann | B60K 15/03 123/198 A |
| 8,360,091 | B2 * | 1/2013 | Revink | F01N 3/2066 137/197 |
| 9,016,330 | B2 * | 4/2015 | Hunt | B60K 15/04 141/106 |
| 9,677,969 | B2 * | 6/2017 | Harle | F02D 19/12 |
| 9,938,943 | B2 * | 4/2018 | Harle | F02D 41/0025 |
| 11,149,753 | B2 * | 10/2021 | Takahashi | F15B 19/005 |
| 11,773,881 | B2 * | 10/2023 | Sizemore | F16L 55/00 60/328 |
| 2010/0228400 | A1 * | 9/2010 | Johnson | F02D 19/12 700/283 |
| 2014/0193230 | A1 * | 7/2014 | McWethy | E02F 3/435 414/815 |
| 2014/0238349 | A1 * | 8/2014 | Harle | F02M 37/0082 123/444 |
| 2017/0138018 | A1 * | 5/2017 | Beschorner | E02F 9/2296 |
| 2018/0038074 | A1 * | 2/2018 | Nishihata | E02F 9/226 |
| 2018/0058482 | A1 * | 3/2018 | Carpenter | E02F 9/268 |
| 2019/0257327 | A1 * | 8/2019 | Chen | E02F 9/267 |
| 2019/0323207 | A1 * | 10/2019 | Jones | E02F 9/2235 |
| 2020/0325657 | A1 * | 10/2020 | Takami | E02F 9/267 |
| 2021/0285842 | A1 * | 9/2021 | Nelson | E02F 9/267 |

FOREIGN PATENT DOCUMENTS

| | | | | | |
|---|---|---|---|---|---|
| EP | 3608548 | A1 | * | 2/2020 | F15B 11/17 |
| EP | 3859091 | A1 | * | 8/2021 | E02F 9/267 |
| JP | 2002-265972 | A | | 9/2002 | |
| JP | 2004028246 | A | * | 1/2004 | |
| JP | 2010-236575 | A | | 10/2010 | |
| JP | 2014-524534 | A | | 9/2014 | |
| JP | 2017-191063 | A | | 10/2017 | |
| JP | 2021-80975 | A | | 5/2021 | |
| JP | 2022-89538 | A | | 6/2022 | |
| JP | 7400791 | B2 | * | 12/2023 | G01N 15/0826 |
| KR | 10-2009-0023801 | A | | 3/2009 | |
| KR | 20240004044 | A | * | 1/2024 | E02F 9/267 |
| WO | WO-2011021405 | A1 | * | 2/2011 | F15B 21/04 |
| WO | WO-2012118564 | A2 | * | 9/2012 | E02F 9/267 |
| WO | WO 2019/021502 | A1 | | 1/2019 | |
| WO | WO-2019049603 | A1 | * | 3/2019 | E02F 9/02 |
| WO | WO-2020083482 | A1 | * | 4/2020 | F15B 11/17 |

OTHER PUBLICATIONS

Japanese-language Written Opinion (PCT/ISA/237) issued in PCT Application No. PCT/JP2023/034898US dated Oct. 24, 2023 with English translation (6 pages).
International Preliminary Report on Patentability (PCT/IB/338 & PCT/IB/373) issued in PCT Application No. PCT/JP2023/034898 dated Apr. 17, 2025, including English translation of Written Opinion (PCT/ISA/237) (5 pages).

* cited by examiner

[FIG. 1]
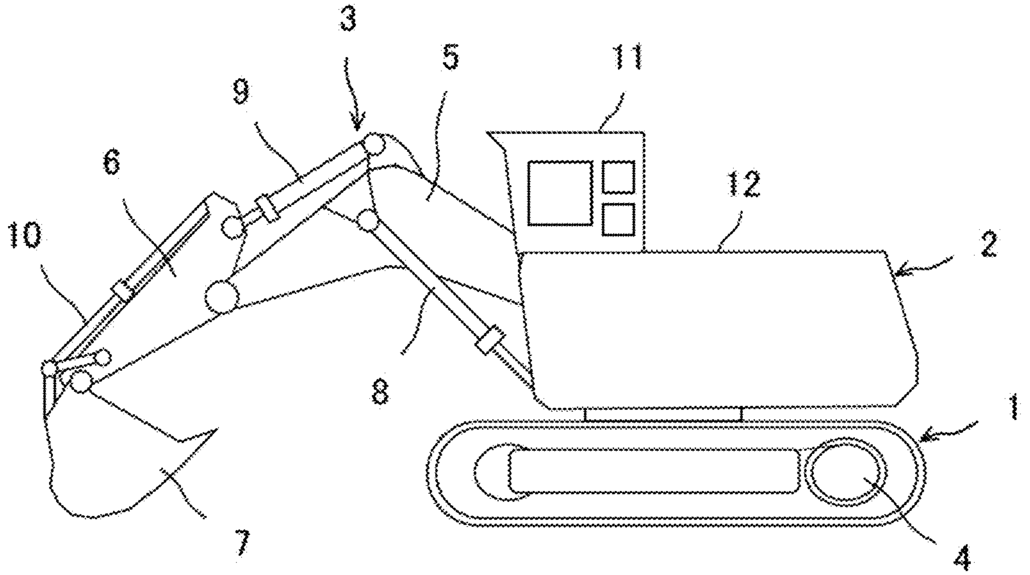

[FIG. 2]
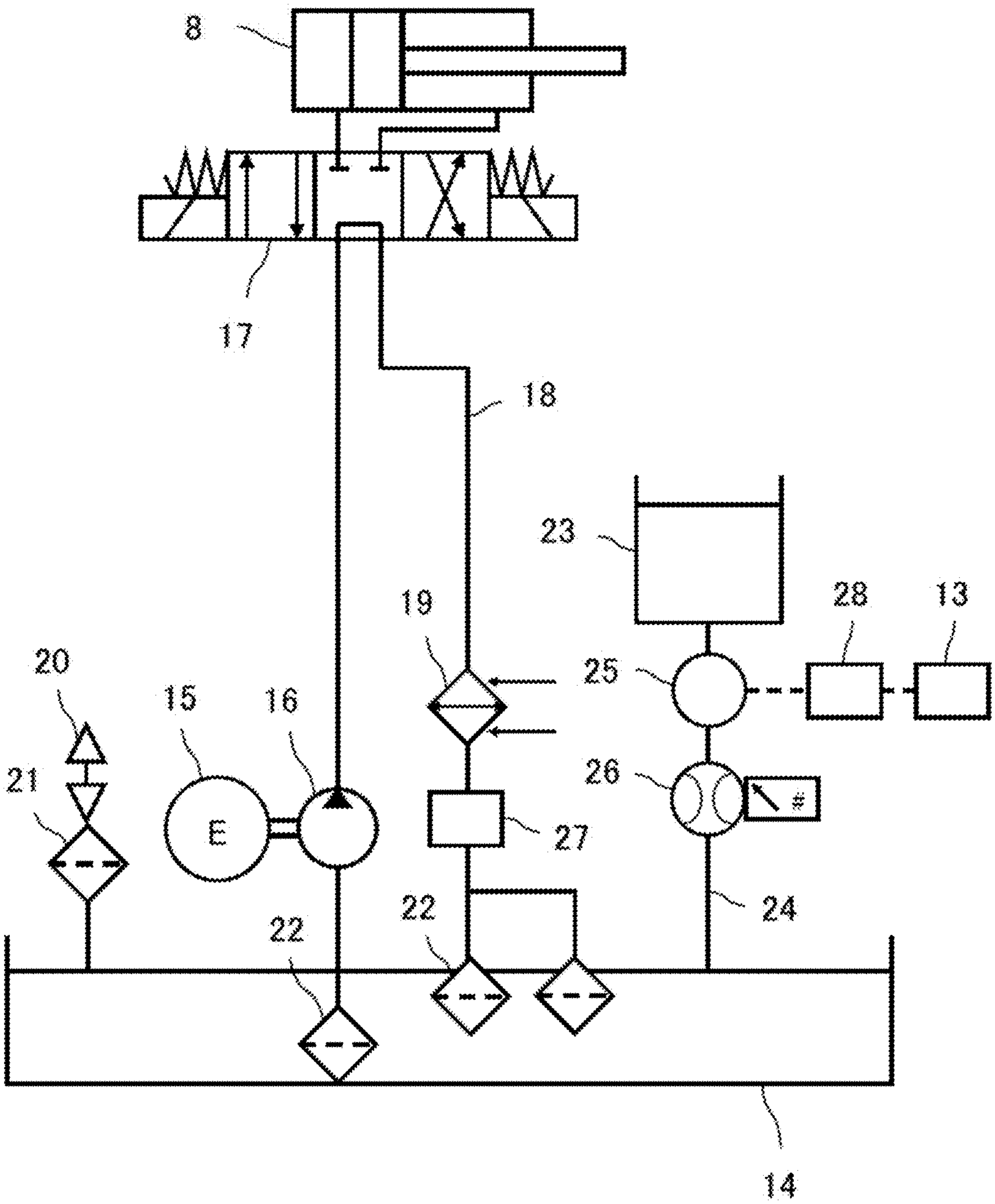

[FIG. 3]
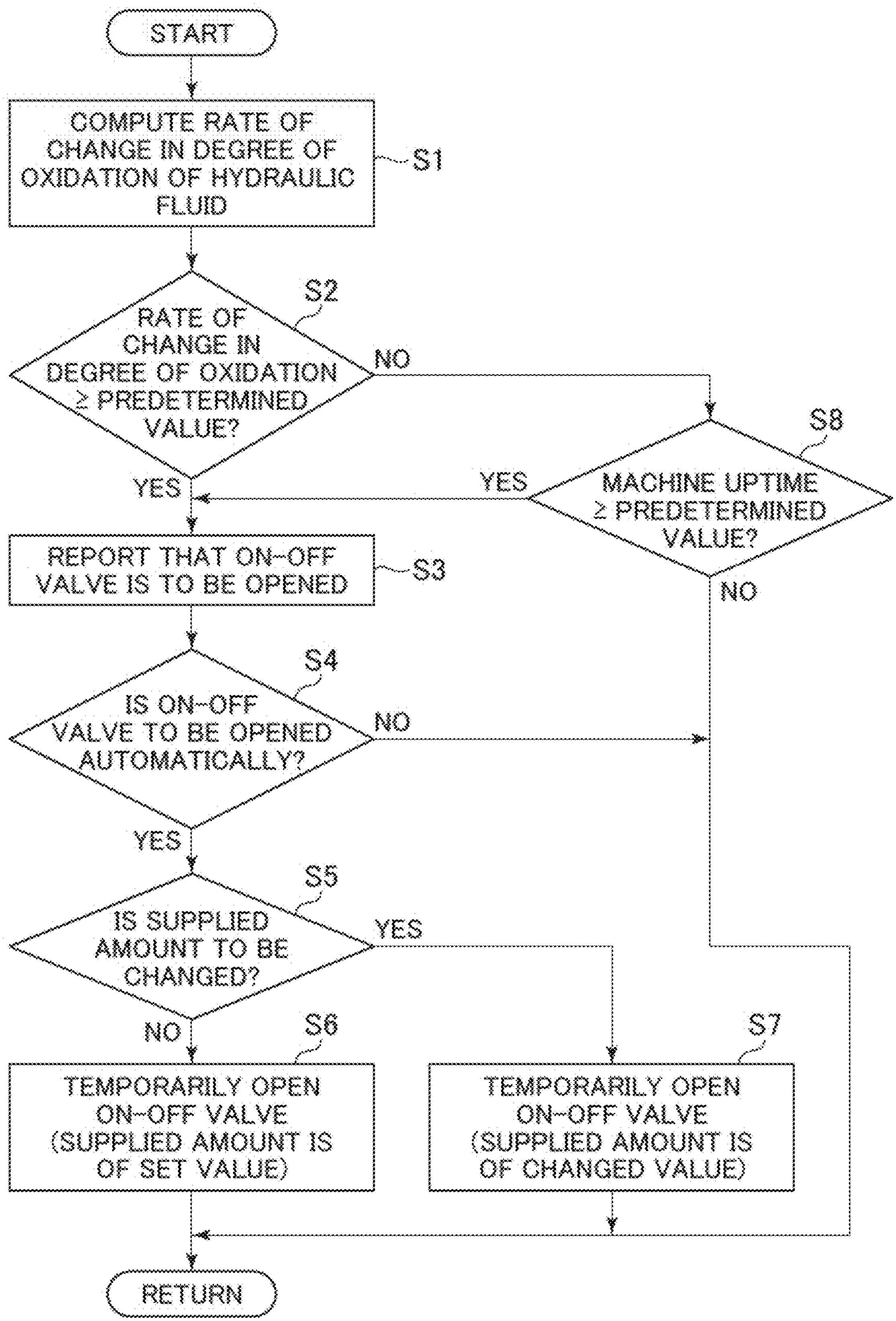

[FIG. 4]
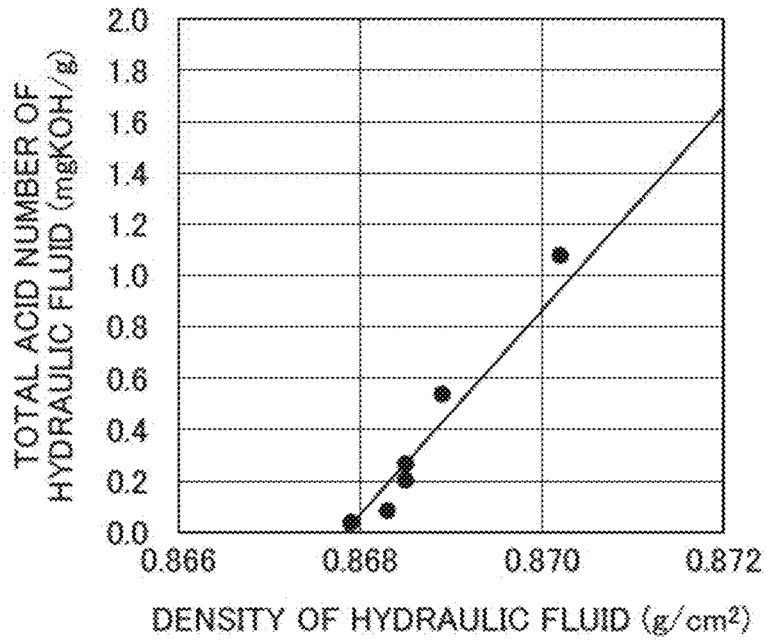

[FIG. 5]

| | INVENTIVE EXAMPLE 1 | INVENTIVE EXAMPLE 2 | INVENTIVE EXAMPLE 3 |
|---|---|---|---|
| ADDITIVE | DIPHENYLAMINE | 2,6-DI-TERT-BUTYL-P-CRESOL | DIPHENYLAMINE<br>2,6-DI-TERT-BUTYL-P-CRESOL |
| INTERVALS FOR REPLACING HYDRAULIC FLUID (RATIO RELATIVE TO CONVENTIONAL ART) | 2.2 | 2.1 | 2.3 |

[FIG. 6]
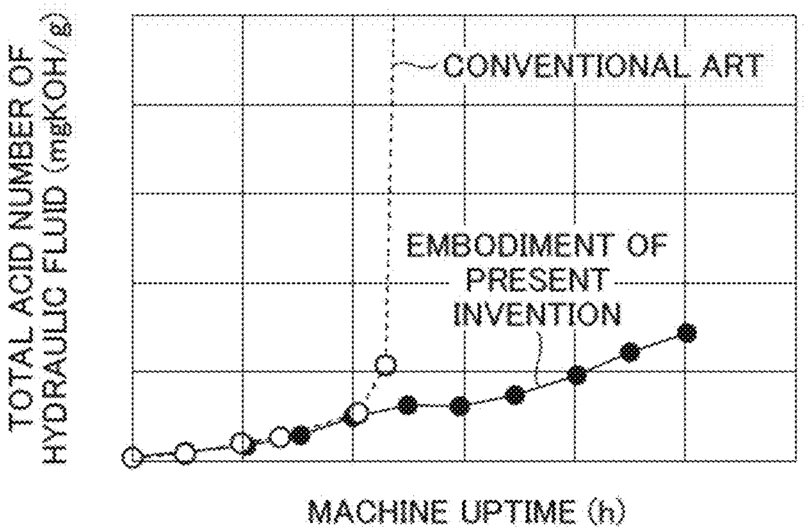
[FIG. 7]
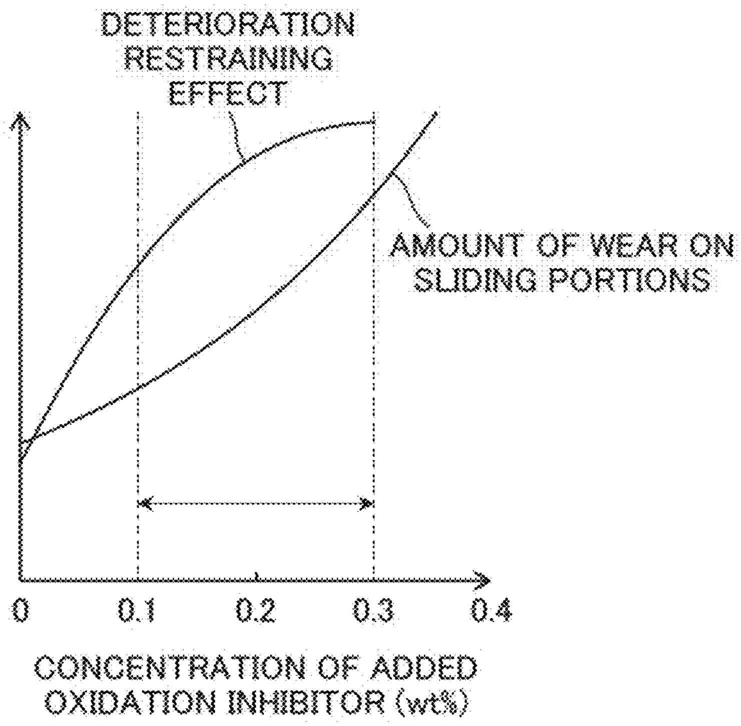

[FIG. 8]
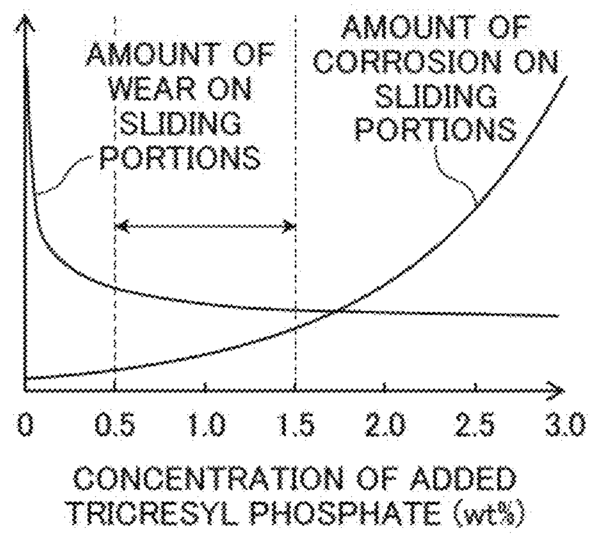
[FIG. 9]
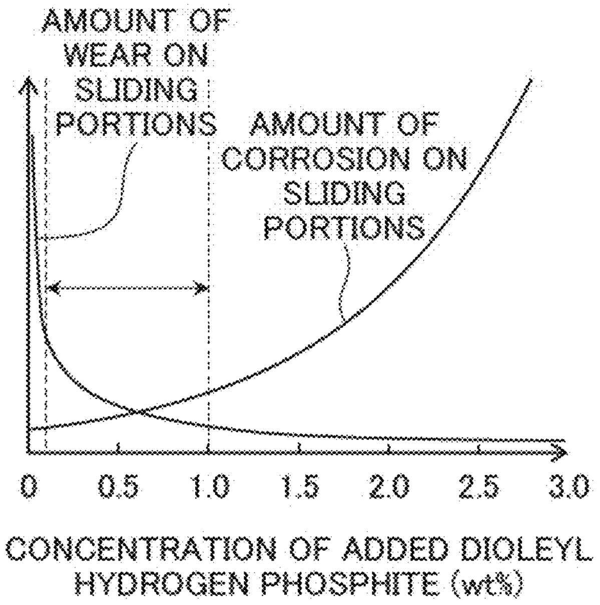

[FIG. 10]

| | INVENTIVE EXAMPLE 4 | INVENTIVE EXAMPLE 5 |
|---|---|---|
| OXIDATION INHIBITOR [ADDED CONCENTRATION] | DIPHENYLAMINE [0.1wt%] | DIPHENYLAMINE 2,6-DI-TERT-BUTYL-P-CRESOL [0.3wt%] |
| EXTREME PRESSURE AGENT [ADDED CONCENTRATION] | TRICRESYL PHOSPHATE [1.5wt%] | TRICRESYL PHOSPHATE [0.5wt%] |
| INTERVALS FOR REPLACING HYDRAULIC FLUID (RATIO RELATIVE TO CONVENTIONAL ART) | 2.2 | 2.3 |
| AMOUNT OF WEAR ON SLIDING PORTIONS | EXTREMELY SMALL | SMALL |
| AMOUNT OF CORROSION ON SLIDING PORTIONS | SMALL | EXTREMELY SMALL |

[FIG. 11]

| | INVENTIVE EXAMPLE 6 | INVENTIVE EXAMPLE 7 |
|---|---|---|
| OXIDATION INHIBITOR [ADDED CONCENTRATION] | DIPHENYLAMINE [0.1wt%] | DIPHENYLAMINE 2,6-DI-TERT-BUTYL-P-CRESOL [0.3wt%] |
| EXTREME PRESSURE AGENT [ADDED CONCENTRATION] | DIOLEYL HYDROGEN PHOSPHITE [1.0wt%] | DIOLEYL HYDROGEN PHOSPHITE [0.1wt%] |
| INTERVALS FOR REPLACING HYDRAULIC FLUID (RATIO RELATIVE TO CONVENTIONAL ART) | 2.2 | 2.3 |
| AMOUNT OF WEAR ON SLIDING PORTIONS | EXTREMELY SMALL | SMALL |
| AMOUNT OF CORROSION ON SLIDING PORTIONS | SMALL | EXTREMELY SMALL |

[FIG. 12]
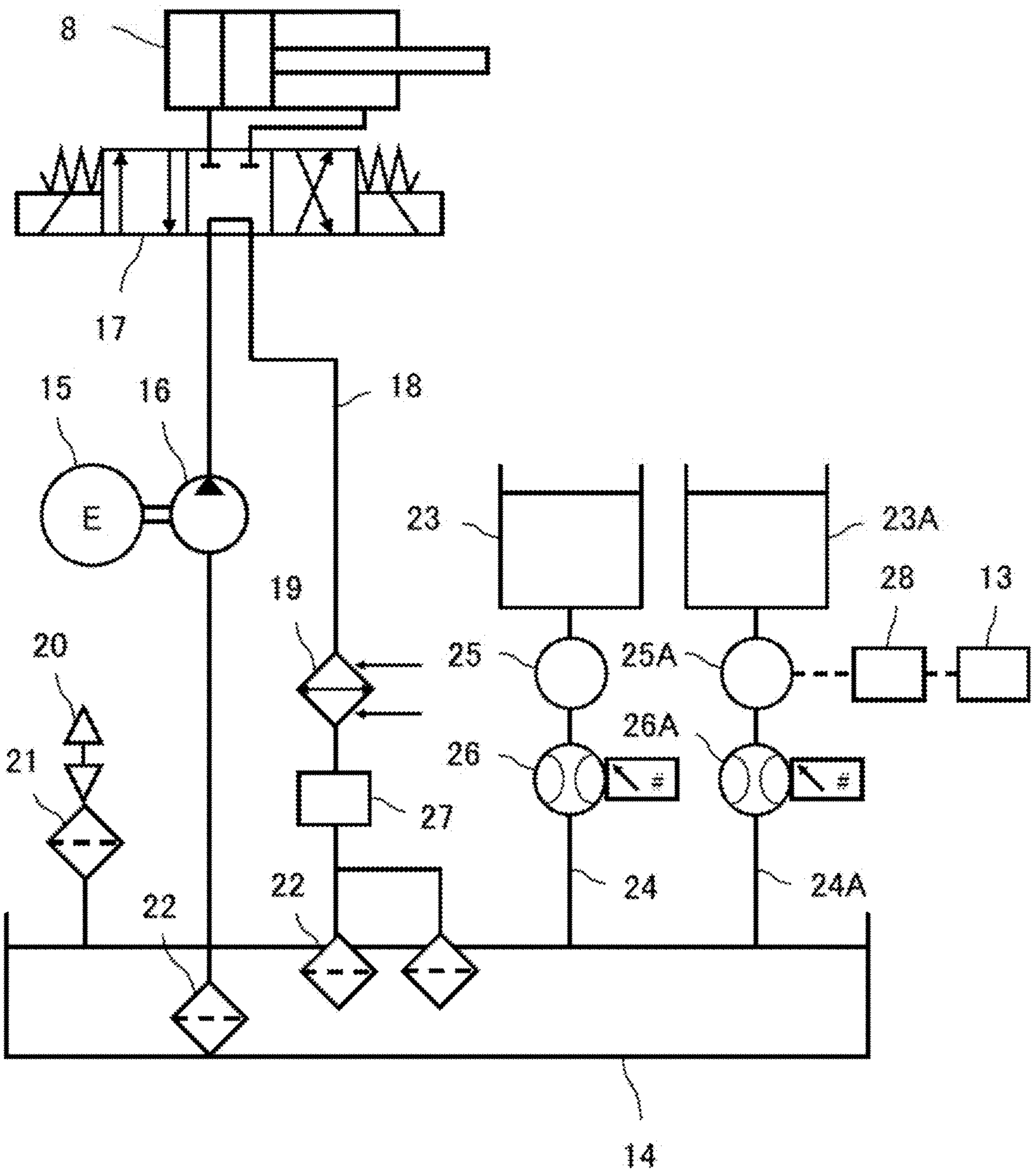

[FIG. 13]
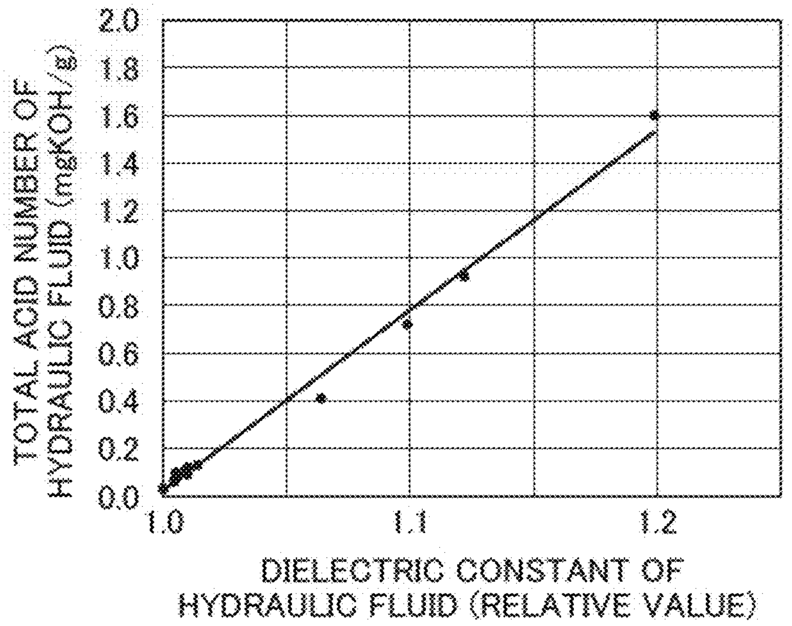

CONSTRUCTION MACHINE

TECHNICAL FIELD

The present invention relates to a construction machine such as a hydraulic excavator or a wheel loader.

BACKGROUND ART

Construction machines include a hydraulic fluid tank for storing a hydraulic fluid, a hydraulic pump driven by an engine or an electrically driven motor, for example, for pressurizing the hydraulic fluid of the hydraulic fluid tank, a hydraulic actuator for actuating a work implement or a track structure, and a control valve for controlling the supply of the hydraulic fluid from the hydraulic pump to the hydraulic actuator and the discharge of the hydraulic fluid from the hydraulic actuator to the hydraulic fluid tank. In response to the operation of a control lever by the operator, the control valve is operated to drive the hydraulic actuator.

The hydraulic fluid for use in the construction machines is made up of base oil and an additive. The base oil is produced by refining crude oil (mineral oil). The additive is added to improve the quality of the hydraulic fluid and is an oxidation inhibitor, for example.

Patent Document 1 discloses a distribution device for distributing an additive to a fuel circulation circuit of an internal combustion engine for automobiles in order to improve the quality of the fuel to be supplied to the internal combustion engine. The distribution device includes an additive tank for storing the additive, an additive distribution channel for distributing the additive from the additive tank to the fuel circulation circuit, and an actuator capable of closing the additive distribution channel. When the internal combustion engine is turned off or there is a possibility that the additive will become so high in viscosity that the additive distribution channel may be clogged, for example, the additive distribution channel is closed. Moreover, while the internal combustion engine is in operation, the frequency at which the additive distribution channel is open or the period of time during which the additive distribution channel is open is made variable to adjust the concentration of the additive in the fuel.

PRIOR ART DOCUMENT

Patent Document

Patent Document 1: JP-2014-524534-T

SUMMARY OF THE INVENTION

Problems to be Solved by the Invention

The hydraulic fluid for use in construction machines tends to deteriorate by oxidation under the influence of heat generated by pressure and flow variations. Oxidative degradation consumes the antioxidants in the hydraulic fluid and further degrades the base oil, leading to a reduction in the lubricating ability of the hydraulic fluid. Since the reduction in the lubricating ability of the hydraulic fluid is likely to cause damage to main components and loss of their functions, the hydraulic fluid needs replacing at periodic intervals.

The inventors of the present application have devised an arrangement for increasing the intervals for replacing a hydraulic fluid by providing an additive tank for storing an additive that is an oxidation inhibitor, for example, an additive supply line for supplying the additive from the additive tank to a hydraulic fluid tank, and an on-off valve disposed on the additive supply line. When the on-off valve switches from a closed state to an open state, the additive is supplied from the additive tank via the additive supply line to the hydraulic fluid tank. In this manner, it is possible to restrain a reduction in the concentration of the additive in the hydraulic fluid, thereby restraining the hydraulic fluid from being deteriorated.

If the timing of the supply of the additive is too late, then the hydraulic fluid tends to deteriorate soon. If the timing of the supply of the additive is too early, then the additive is liable to be consumed quickly, so that the intervals for replenishing the additive are shortened. Therefore, it is preferable to appropriately report or control the timing of the supply of the additive, i.e., the timing of opening of the on-off valve.

The present invention has been made in view of the above problems. It is an object of the present invention to provide a construction machine capable of increasing the intervals for replacing a hydraulic fluid.

Means for Solving the Problems

In order to achieve the above object, there is provided according to the present invention a construction machine including a hydraulic fluid tank for storing a hydraulic fluid, a hydraulic pump for pressurizing the hydraulic fluid of the hydraulic fluid tank, a hydraulic actuator, and a control valve for controlling supply of the hydraulic fluid from the hydraulic pump to the hydraulic actuator and discharge of the hydraulic fluid from the hydraulic actuator to the hydraulic fluid tank, the construction machine further including an additive tank for storing an additive, an additive supply line for supplying the additive from the additive tank to the hydraulic fluid tank, an on-off valve disposed on the additive supply line and switchable between a closed state and an open state, for cutting off the supply of the additive from the additive tank to the hydraulic fluid tank in the closed state and supplying the additive from the additive tank to the hydraulic fluid tank in the open state, a degree-of-oxidation sensor for sensing a degree to which the hydraulic fluid has been oxidized, and a controller, in which the controller is configured to compute a rate of change in the degree to which the hydraulic fluid has been oxidized, on the basis of a sensed result from the degree-of-oxidation sensor, and perform control for reporting that the on-off valve is to switch into the open state or control for switching the on-off valve into the open state when the rate of change in the degree to which the hydraulic fluid has been oxidized is equal to or higher than a predetermined value, and performs control for reporting that the on-off valve is to switch into the open state or control for switching the on-off valve into the open state when the rate of change in the degree to which the hydraulic fluid has been oxidized is lower than the predetermined value but a machine uptime from the time of replacement of the hydraulic fluid or a machine uptime from the time of switching of the on-off valve from the open state into the closed state is equal to or longer than a predetermined value.

Advantages of the Invention

According to the present invention, it is possible to increase intervals for replacing a hydraulic fluid.

BRIEF DESCRIPTION OF THE DRAWINGS

FIG. 1 is a side elevational view illustrating the structure of a hydraulic excavator according to a first embodiment of the present invention.

FIG. 2 is a diagram illustrating the configuration of a drive system as well as related equipment of the hydraulic excavator according to the first embodiment of the present invention.

FIG. 3 is a flowchart illustrating a processing sequence of a controller according to the first embodiment of the present invention.

FIG. 4 is a diagram representing the relation between the density and the total acid number of a hydraulic fluid according to the first embodiment of the present invention.

FIG. 5 is a diagram representing inventive examples of additives and their effects according to the first embodiment of the present invention.

FIG. 6 is a diagram representing changes in the total acid number of the hydraulic fluid according to the first embodiment of the present invention and the conventional art.

FIG. 7 is a diagram representing the relation between the added concentration and the deterioration restraining effect of an oxidation inhibitor and the relation between the added concentration of the oxidation inhibitor and the amount of wear of a sliding portion according to a second embodiment of the present invention.

FIG. 8 is a diagram representing the relation between the added concentration of tricresyl phosphate and the amount of wear of a sliding portion and the relation between the added concentration of tricresyl phosphate and the amount of corrosion on the sliding portion according to the second embodiment of the present invention.

FIG. 9 is a diagram representing the relation between the added concentration of dioleyl hydrogen phosphite and the amount of wear of a sliding portion and the relation between the added concentration of dioleyl hydrogen phosphite and the amount of corrosion on the sliding portion according to the second embodiment of the present invention.

FIG. 10 is a diagram representing inventive examples of additives and their effects according to the second embodiment of the present invention.

FIG. 11 is a diagram representing inventive examples of additives and their effects according to the second embodiment of the present invention.

FIG. 12 is a diagram illustrating the configuration of a drive system as well as related equipment of the hydraulic excavator according to a modification of the present invention.

FIG. 13 is a diagram representing the relation between the dielectric constant and the total acid number of a hydraulic fluid according to another modification of the present invention.

MODES FOR CARRYING OUT THE INVENTION

A first embodiment of the present invention as it is applied to a hydraulic excavator, for example, will be described below with reference to the drawings.

FIG. 1 is a side elevational view illustrating the structure of the hydraulic excavator according to the present embodiment.

The hydraulic excavator according to the present embodiment includes a track structure 1 that can travel, a swing structure 2 swingably mounted on an upper side of the track structure 1, and a work implement 3 coupled to a front side (left side in FIG. 1) of the swing structure 2. The track structure 1 and the swing structure 2 configure a vehicle body. The track structure 1 travels by rotation of a track motor 4, whereas the swing structure 1 swings by rotation of a swing motor (not depicted).

The work implement 3 includes a boom 5 pivotally coupled to the front side of the swing structure 2, an arm 6 pivotally coupled to a distal end of the boom 5, and a bucket 7 pivotally coupled to a distal end of the arm 6. The boom 5 pivots by a boom cylinder 8 as it is extended or contracted. The arm 6 pivots by an arm cylinder 9 as it is extended or contracted. The bucket 7 pivots by a bucket cylinder 10 as it is extended or contracted.

The swing structure 2 includes a cabin 11 to be occupied by the operator and a machine compartment 12 disposed in an area of the swing structure 2 other than the cabin 11. The cabin 11 houses a plurality of operation devices (not depicted) that can be operated by the operator and a monitor 13 (see FIG. 2 to be described later). The monitor 13 has a display for displaying messages and other images and buttons for entering numerical values, for example.

The hydraulic excavator according to the present embodiment includes a drive system for driving a plurality of actuators (specifically, the track motor 4, the swing motor, the boom cylinder 8, the arm cylinder 9, and the bucket cylinder 10 described above) in response to the operation of the plurality of operation devices. FIG. 2 is a diagram illustrating the configuration of the drive system as well as related equipment of the hydraulic excavator according to the present embodiment. FIG. 2 illustrates only those parts involved in the boom cylinder 8 among the structural details of the drive system.

The drive system according to the present embodiment includes a hydraulic fluid tank 14 for storing a hydraulic fluid, a hydraulic pump 16 driven by an engine 15 for pressurizing the hydraulic fluid of the hydraulic fluid tank 14, a control valve 17 that operates according to the operation of the operation device and controls the supply of the hydraulic fluid from the hydraulic pump 16 to the boom cylinder 8 and the discharge of the hydraulic fluid from the boom cylinder 8 to the hydraulic fluid tank 14, and an air-cooled or water-cooled cooler 19 for cooling the hydraulic fluid, the cooler 19 being disposed on a discharge line 18 along which the hydraulic fluid is discharged from the control valve 17 to the hydraulic fluid tank 14. The pieces of equipment described above are housed in the machine compartment 12 of the swing structure 2.

The hydraulic fluid tank 14 has an air breather 20 for introducing ambient air into the tank to regulate the pressure in the tank to the external atmospheric pressure, an air filter 21 connected to the air breather 20 for removing foreign matter from the ambient air, and oil filters 22 connected to the hydraulic pump 16 and the cooler 19 for removing foreign matter such as sludge from the hydraulic fluid. The hydraulic fluid tank 14 has a capacity of 200 L, for example.

The hydraulic fluid stored in the hydraulic fluid tank 14 is made up of base oil and an additive. The base oil is mineral oil. The hydraulic fluid has a viscosity grade of VG46, for example.

The additive contained in the hydraulic fluid is, for example, an oxidation inhibitor, an extreme pressure agent (load bearing additive), a detergent dispersant, a viscosity index improver, a defoamer, or a demulsifier. The oxidation inhibitor may be zinc dithiophosphate, organic sulfur compound, hindered phenol, or aromatic amine, for example. The extreme pressure agent may be higher fatty acid, higher alcohol, phosphate ester, phosphite ester, or thiophosphate, for example. The detergent dispersant may be organic acid metal compound, neutral/over-based metal, over-based metal sulfonate, over-based metal phenate, over-based metal sulfonate, succinimide, succinate ester, or benzylamine, for example. The viscosity index improver may be polymethacrylate, olefin copolymer, styrene olefin copolymer, or polyisobutylene, for example. The defoamer may be polymethylsiloxane, silicate, organic fluorine compound, metal soap, fatty acid ester, phosphate ester, higher alcohol, or polyalkylene glycol, for example. The demulsifier may be ethylene oxide adduct, ethylene oxide, propylene oxide block polymer, or quaternary ammonium salt, for example.

The hydraulic fluid suffers oxidative deterioration due to the heat generated when a pressure is applied thereto or released therefrom. The process will be described in detail below. The base oil of the hydraulic fluid is mainly made up of hydrocarbon. When hydrocarbon is pyrolyzed, it produces hydrocarbon radicals that are turned into peroxy radicals by being combined with oxygen. Thereafter, the peroxy radicals are combined with undecomposed base oil and hydroxy radicals, becoming alcohol and aldehyde, and eventually change into carboxylic acid. As the carboxylic acid increases to make the total acid number of the hydraulic fluid higher, i.e., as the oxidative deterioration of the hydraulic fluid progresses, the oxidation inhibitor contained in the hydraulic fluid is consumed, and corrosion and elution may possibly occur in hydraulic equipment and pipes. Therefore, the hydraulic fluid stored in the hydraulic fluid tank 14 needs to be replaced at periodic intervals.

The hydraulic excavator according to the present embodiment includes, as a configuration for increasing intervals for replacing the hydraulic fluid, an additive tank 23 for storing the additive that is disposed in the vicinity of the hydraulic fluid tank 14, an additive supply line 24 for supplying the additive from the additive tank 23 to the hydraulic fluid tank 14, an on-off valve 25 disposed on the additive supply line 24 and switchable between a closed state and an open state, a flowmeter 26 disposed on the additive supply line 24 for sensing and displaying the flow rate of the additive, a degree-of-oxidation sensor 27 disposed on the discharge line 18 downstream of the cooler 19 for sensing a degree to which the hydraulic fluid has been oxidized (a degree of oxidation), and a controller 28.

The on-off valve 25 is normally in the open state to cut off the supply of the additive from the additive tank 23 to the hydraulic fluid tank 14. When the on-off valve 25 is electrically or manually switched to the closed-state, it supplies the additive from the additive tank 23 to the hydraulic fluid tank 14.

The additive tank 23 stores the additive in the form of a solute dissolved at a concentration of 10 weight % in the base oil whose viscosity grade is of VG46, for example. The additive is an oxidation inhibitor and may be dithiophosphate, organic sulfur compound, hindered phenol, or aromatic amine, for example. In particular, the additive is preferably diphenylamine or/and 2,6-di-tert-butyl-p-cresol. The additive tank 23 has a capacity of 10 L, for example.

The controller 28 has a processor, not depicted, for carrying out processing operations according to programs and a memory, not depicted, for storing the programs and data. The controller 28 controls the monitor 13 and the on-off valve 25 on the basis of sensed result from the degree-of-oxidation sensor 27. Processing sequence details of the controller 28 will be described below with reference to FIG. 3. FIG. 3 is a flowchart illustrating the processing sequence of the controller according to the present embodiment.

In step S1, the controller 28 computes a rate of change in the degree of oxidation of the hydraulic fluid, on the basis of the sensed result from the degree-of-oxidation sensor 27. Specifically, the degree-of-oxidation sensor 27 according to the present embodiment is a density sensor for sensing a density of the hydraulic fluid. The controller 28 computes a rate of change in the density by computing a difference between a sensed density value in a present cycle and a sensed density value in a preceding cycle and dividing the difference by the sensed density value in the preceding cycle, for example.

The reasons why the density of the hydraulic fluid is sensed and a rate of change in the density is computed will be described below. Though the total acid number of a hydraulic fluid represents an index indicative of the degree of oxidation of the hydraulic fluid, it is difficult to measure. It is known that a hydraulic fluid takes in oxygen into its molecular structure upon oxidative deterioration, increasing its density. In other words, as illustrated in FIG. 4, the density and the total acid number of a hydraulic fluid are proportional to each other. Consequently, the density of a hydraulic fluid that is commensurate with the total acid number thereof is sensed, and its rate of change is computed. A rate of change in the density of the hydraulic fluid means a rate of change in the degree of oxidation of the hydraulic fluid.

In step S2, the controller 28 determines whether the rate of change in the degree of oxidation of the hydraulic fluid is equal to or higher than a predetermined value (e.g., 0.05%), thereby determining whether the rate at which the oxidative deterioration of the hydraulic fluid is progressing is equal to or higher than an expected value.

When the rate of change in the degree of oxidation of the hydraulic fluid is equal to or higher than the predetermined value in step S2, then control goes to step S3. In step S3, the controller 28 controls the monitor 13 to display a message representing that the on-off valve 25 is to be opened (the on-off valve 25 is to switch into the open state) and a message prompting the operator to enter an input indicating whether the on-off valve 25 is to be opened automatically or not. Thereafter, control goes to step S4 in which the controller 28 determines whether an input for automatically opening the on-off valve 25 has been entered on the monitor 13 or not.

When an input for not automatically opening the on-off valve 25 has been entered on the monitor 13 in step S4, then the processing comes to an end. The operator manually switches the on-off valve 25 from the closed state to the open state. The additive is now supplied from the additive tank 23 via the additive supply line 24 to the hydraulic fluid tank 14. The operator then checks the supplied amount of the additive on the basis of the flow rate of the additive displayed on the flowmeter 26. When the supplied amount of the additive has reached a desired value, the operator manually switches the on-off valve 25 from the open state to the closed state.

When an input for automatically opening the on-off valve 25 has been entered on the monitor 13 in step S4, then control goes to step S5. In step S5, the controller 28 controls the monitor 13 to display a message prompting the operator to enter an input indicating whether the supplied amount of the additive is to be changed or not. Then, the controller 28 determines whether an input indicating that the supplied amount of the additive is to be changed has been entered on the monitor 13 or not.

When an input indicating that the supplied amount of the additive is not to be changed has been entered on the monitor 13 in step S5, then control goes to step S6. In step S6, the controller 28 switches the on-off valve 25 from the closed state to the open state. The additive is now supplied from the additive tank 23 via the additive supply line 24 to the hydraulic fluid tank 14. Thereafter, the controller 28 computes the supplied amount of the additive on the basis of the sensed result from the flowmeter 26. When the supplied amount of the additive has reached a preset value, then the controller 28 switches the on-off valve 25 from the open state to the closed state.

When an input indicating that the supplied amount of the additive is to be changed has been entered and an input indicating a changed value of the supplied amount of the additive has been entered on the monitor 13, then control goes to step S7. In step S7, the controller 28 switches the on-off valve 25 from the closed state to the open state. The additive is now supplied from the additive tank 23 via the additive supply line 24 to the hydraulic fluid tank 14. Thereafter, the controller 28 computes the supplied amount of the additive on the basis of the sensed result from the flowmeter 26. When the supplied amount of the additive has reached the changed value, then the controller 28 switches the on-off valve 25 from the open state to the closed state.

When the rate of change in the degree of oxidation of the hydraulic fluid is lower than the predetermined value in step S2, then control goes to step S8. In step S8, the controller 28 determines whether the machine uptime from the time of replacement of the hydraulic fluid or the machine uptime from the time of switching of the on-off valve 25 from the open state to the closed state (stated otherwise, the cumulative operation time of the engine 15) is equal to or longer than a predetermined value (e.g., 2000 hours).

When the machine uptime is shorter than the predetermined value in step S8, then the processing sequence is finished. On the other hand, when the machine uptime is equal to or longer than the predetermined value, then control goes to step S3. Thereafter, the processing described above is carried out.

According to the present embodiment, as described above, the additive is supplied from the additive tank 23 via the additive supply line 24 to the hydraulic fluid tank 14 to restrain a reduction in the concentration of the additive in the hydraulic fluid, thereby restraining the hydraulic fluid from deteriorating. Consequently, the intervals for replacing the hydraulic fluid are increased.

According to the present embodiment, furthermore, in a case where the rate of change in the degree of oxidation of the hydraulic fluid is equal to or higher than the predetermined value, the timing of the supply of the additive is reported or controlled. In a case where the rate of change in the degree of oxidation of the hydraulic fluid is lower than the predetermined value and the machine uptime has reached the predetermined value, the timing of the supply of the additive is reported or controlled. Therefore, the hydraulic fluid is restrained from deteriorating. Moreover, the intervals for replenishing the additive are increased.

Inventive examples of additives stored in the additive tank 23 and their effects will be described below with reference to FIGS. 5 and 6. As illustrated in FIG. 5, the additive according to inventive example 1 is diphenylamine, the additive according to inventive example 2 is 2,6-di-tert-butyl-p-cresol, and the additives according to inventive example 3 are diphenylamine and 2,6-di-tert-butyl-p-cresol. As illustrated in FIG. 6, according to the conventional art (stated otherwise, in a case where no additive is supplied to the hydraulic fluid tank 14), the total acid number of the hydraulic fluid rises significantly as the machine uptime increases. According to the present embodiment, however, even when the machine uptime increases, the total acid number of the hydraulic fluid is restrained from increasing. The intervals for replacing the hydraulic fluid may hence be 2.1 to 2.3 times longer than that in the conventional art. The concentration of the oxidation inhibitor added to the hydraulic fluid is in the range of 0.1 to 0.3 wt %, for example.

A second embodiment of the present invention will be described below. Those parts of the present embodiment that are equivalent to those of the first embodiment are denoted by identical reference characters and will accordingly be omitted from description.

The extreme pressure agent that is contained in the hydraulic fluid restrains wear on sliding portions (metal) of hydraulic equipment by reacting on the surfaces of the sliding portions and forming a film thereon. However, the extreme pressure agent is consumed while the hydraulic fluid is used over a long period of time. Moreover, when the oxidation inhibitor is supplied to the hydraulic fluid tank 14 as in the first embodiment, the extreme pressure agent has its wear restraining effect lowered due to its reaction with the oxidation inhibitor. According to the present embodiment, therefore, the additives stored in the additive tank 23 are an oxidation inhibitor and an extreme pressure agent, and the oxidation inhibitor and the extreme pressure agent are supplied to the hydraulic fluid tank 14.

The oxidation inhibitor may be zinc dithiophosphate, organic sulfur compound, hindered phenol, or aromatic amine, for example. In particular, the oxidation inhibitor should preferably be diphenylamine or/and 2,6-di-tert-butyl-p-cresol.

The concentration of the oxidation inhibitor added to the hydraulic fluid should preferably be in the range of 0.1 to 0.3 wt %, for example. The reasons for setting the concentration in the above range will be described below with reference to FIG. 7. If the concentration of the oxidation inhibitor added to the hydraulic fluid is lower than 0.3 wt %, then the deterioration restraining effect thereof increases as the concentration of the added oxidation inhibitor increases. If the concentration of the added oxidation inhibitor is equal to or higher than 0.3 wt %, then the deterioration restraining effect thereof remains essentially constant despite an increase in the concentration of the added oxidation inhibitor. Meanwhile, as the concentration of the added oxidation inhibitor increases, the wear restraining effect thereof decreases, and the amount of wear on the sliding portions increases. In order to increase the deterioration restraining effect to a level equal to or higher than a predetermined requisite value while reducing the amount of wear on the sliding portions to a level equal to or lower than a predetermined requisite value, the concentration of the oxidation inhibitor added to the hydraulic fluid should preferably be in the range of 0.1 to 0.3 wt %.

The extreme pressure agent may be phosphate ester, phosphite ester, or thiophosphate, for example. In particular, the extreme pressure agent should preferably be tricresyl phosphate or/and dioleyl hydrogen phosphite.

In a case where only tricresyl phosphate is supplied as the extreme pressure agent, the concentration of tricresyl phosphate added to the hydraulic fluid should preferably be in the range of 0.5 to 1.5 wt %. The reasons for setting the concentration in the above range will be described below with reference to FIG. 8. If the concentration of the added tricresyl phosphate is lower than 0.5 wt %, then the amount of wear on the sliding portions decreases sharply as the concentration of the added tricresyl phosphate increases. If the concentration of the added tricresyl phosphate is equal to or higher than 0.5 wt %, then the amount of wear on the sliding portions decreases gradually as the concentration of the added tricresyl phosphate increases. Meanwhile, the amount of corrosion on the sliding portions increases as the concentration of the added tricresyl phosphate increases. In order to reduce the amount of corrosion on the sliding portions to a level equal to or lower than a predetermined requisite value while reducing the amount of wear on the sliding portions to a level equal to or lower than a predetermined requisite value, the concentration of tricresyl phosphate added to the hydraulic fluid should preferably be in the range of 0.5 to 1.5 wt %.

In a case where only dioleyl hydrogen phosphite is supplied as the extreme pressure agent, the concentration of dioleyl hydrogen phosphite added to the hydraulic fluid should preferably be in the range of 0.1 to 1.0 wt %. The reasons for setting the concentration in the above range will be described below with reference to FIG. 9. If the concentration of the added dioleyl hydrogen phosphite is lower than 0.1 wt %, then the amount of wear on the sliding portions decreases sharply as the concentration of the added dioleyl hydrogen phosphite increases. If the concentration of the added dioleyl hydrogen phosphite is equal to or higher than 0.1 wt %, then the amount of wear on the sliding portions decreases gradually as the concentration of the added dioleyl hydrogen phosphite increases. Meanwhile, the amount of corrosion on the sliding portions increases as the concentration of the added dioleyl hydrogen phosphite increases. In order to reduce the amount of corrosion on the sliding portions to a level equal to or lower than a predetermined requisite value while reducing the amount of wear on the sliding portions to a level equal to or lower than a predetermined requisite value, the concentration of dioleyl hydrogen phosphite added to the hydraulic fluid should preferably be in the range of 0.1 to 1.0 wt %.

According to the present embodiment, as in the first embodiment, the additive is supplied from the additive tank 23 via the additive supply line 24 to the hydraulic fluid tank 14 to restrain a reduction in the concentration of the additive in the hydraulic fluid, thereby restraining the hydraulic fluid from deteriorating. Consequently, the intervals for replacing the hydraulic fluid are increased. Moreover, the intervals for replenishing the additive are increased.

Inventive examples of additives stored in the additive tank 23 and their effects will be described below with reference to FIGS. 10 and 11. As illustrated in FIGS. 10 and 11, the additives according to inventive example 4 are diphenylamine and tricresyl phosphate, the additives according to inventive example 5 are diphenylamine, 2,6-di-tert-butyl-p-cresol, and tricresyl phosphate, the additives according to inventive example 6 are diphenylamine and dioleyl hydrogen phosphite, and the additives according to inventive example 7 are diphenylamine, 2,6-di-tert-butyl-p-cresol, and dioleyl hydrogen phosphite. The intervals for replacing the hydraulic fluid may be 2.1 to 2.3 times longer than that in the conventional art. Furthermore, the amount of wear and the amount of corrosion on the hydraulic equipment are reduced.

According to the second embodiment, the hydraulic excavator has been described by way of example as including the additive tank 23 for storing the oxidation inhibitor and the extreme pressure agent. However, the present invention is not limited to the illustrated hydraulic excavator. According to a modification illustrated in FIG. 12, a hydraulic excavator may include the additive tank 23 for storing the oxidation inhibitor and an additive tank 23A for storing the extreme pressure agent. The hydraulic excavator according to the present modification further includes an additive supply line 24A for supplying the extreme pressure agent from the additive tank 23A to the hydraulic fluid tank 14, an on-off valve 25A disposed on the additive supply line 24A and switchable between a closed state and an open state, and a flowmeter 26A disposed on the additive supply line 24A for sensing and displaying the flow rate of the extreme pressure agent. The controller 28 controls the monitor 13 to display a message representing that the on-off valves 25 and 25A are to be opened (the on-off valves 25 and 25A are to switch into the open state) and a message prompting the operator to enter an input indicating whether the on-off valves 25 and 25A are to be opened automatically or not. When an input for automatically opening the on-off valves 25 and 25A has been entered on the monitor 13, then the controller 28 temporarily opens the on-off valves 25 and 25A (i.e., switches the on-off valves 25 and 25A into the open state). According to the present modification, the concentration of the added oxidation inhibitor and the concentration of the added extreme pressure agent can individually be changed.

According to the first embodiment and the second embodiment as well as the modification of the second embodiment, the degree-of-oxidation sensor 27 has been described by way of example as a density sensor for sensing the density of the hydraulic fluid. However, the present invention is not limited to the illustrated degree-of-oxidation sensor. It is known in the art that a hydraulic fluid takes in oxygen into its molecular structure upon oxidative deterioration, increasing its dielectric constant. In other words, as illustrated in FIG. 13, the dielectric constant and the total acid number of a hydraulic fluid are proportional to each other. Consequently, the degree-of-oxidation sensor 27 may be a dielectric constant sensor for sensing the dielectric constant of the hydraulic fluid. In this case, the controller 28 may compute a rate of change in the dielectric constant of the hydraulic fluid as a rate of change in the degree of oxidation of the hydraulic fluid.

Moreover, according to the first embodiment and the second embodiment as well as the modification of the second embodiment, the controller 28 has been described by way of example as controlling the monitor 13 to display and report a message representing that the on-off valve is to be opened (i.e., the on-off valve is to switch into the open state). However, the present invention is not limited to the illustrated controller. The controller 28 may control a speaker to output and report a speech sound indicating that the on-off valve is to be opened (i.e., the on-off valve is to switch into the open state), for example.

Further, according to the first embodiment and the second embodiment as well as the modification of the second embodiment, the controller 28 has been described by way of example as performing both control for reporting that the on-off valve is to be opened (i.e., the on-off valve is to switch into the open state) and control for temporarily opening the on-off valve (i.e., switching the on-off valve into the open state). However, the present invention is not limited to the illustrated controller. The controller 28 may perform only one of the control for reporting that the on-off valve is to be opened (i.e., the on-off valve is to switch into the open state) and the control for temporarily opening the on-off valve (i.e., switching the on-off valve into the open state).

The present invention has been described by way of example as being applied to hydraulic excavators. However, the present invention is not limited to being applied to hydraulic excavators. The present invention is also applicable to other construction machines (e.g., wheel loaders).

DESCRIPTION OF REFERENCE CHARACTERS

4: Track motor
8: Boom cylinder
9: Arm cylinder
10: Bucket cylinder
14: Hydraulic fluid tank
16: Hydraulic pump
17: Control valve
23, 23A: Additive tank
24, 24A: Additive supply line
25, 25A: On-off valve
27: Degree-of-oxidation sensor
28: Controller

The invention claimed is:

1. A construction machine including a hydraulic fluid tank for storing a hydraulic fluid, a hydraulic pump for pressurizing the hydraulic fluid of the hydraulic fluid tank, a hydraulic actuator, and a control valve for controlling supply of the hydraulic fluid from the hydraulic pump to the hydraulic actuator and discharge of the hydraulic fluid from the hydraulic actuator to the hydraulic fluid tank, the construction machine comprising:

an additive tank for storing an additive;

an additive supply line for supplying the additive from the additive tank to the hydraulic fluid tank;

an on-off valve disposed on the additive supply line and switchable between a closed state and an open state, for cutting off the supply of the additive from the additive tank to the hydraulic fluid tank in the closed state and supplying the additive from the additive tank to the hydraulic fluid tank in the open state;

a degree-of-oxidation sensor for sensing a degree to which the hydraulic fluid has been oxidized; and a controller, wherein the controller is configured to compute a rate of change in the degree to which the hydraulic fluid has been oxidized, on a basis of a sensed result from the degree-of-oxidation sensor, and perform control for reporting that the on-off valve is to switch into the open state or control for switching the on-off valve into the open state when the rate of change in the degree to which the hydraulic fluid has been oxidized is equal to or higher than a predetermined value, and performs control for reporting that the on-off valve is to switch into the open state or control for switching the on-off valve into the open state when the rate of change in the degree to which the hydraulic fluid has been oxidized is lower than the predetermined value but a machine uptime from a time of replacement of the hydraulic fluid or a machine uptime from a time of switching of the on-off valve from the open state into the closed state is equal to or longer than a predetermined value.

2. The construction machine according to claim 1, wherein the additive is an oxidation inhibitor.

3. The construction machine according to claim 2, wherein the oxidation inhibitor is diphenylamine or/and 2,6-di-tert-butyl-p-cresol and is added in a concentration ranging from 0.1 to 0.3 wt %.

4. The construction machine according to claim 1, wherein the additive is an oxidation inhibitor and an extreme pressure agent.

5. The construction machine according to claim 4, wherein the oxidation inhibitor is diphenylamine or/and 2,6-di-tert-butyl-p-cresol and is added in a concentration ranging from 0.1 to 0.3 wt %.

6. The construction machine according to claim 4, wherein the extreme pressure agent is tricresyl phosphate and is added in a concentration ranging from 0.5 to 1.5 wt %.

7. The construction machine according to claim 4, wherein the extreme pressure agent is dioleyl hydrogen phosphite and is added in a concentration ranging from 0.1 to 1.0 wt %.

* * * * *